J. E. GRIFFIN.
LEVEL.
APPLICATION FILED AUG. 21, 1916.
1,239,590.
Patented Sept. 11, 1917.
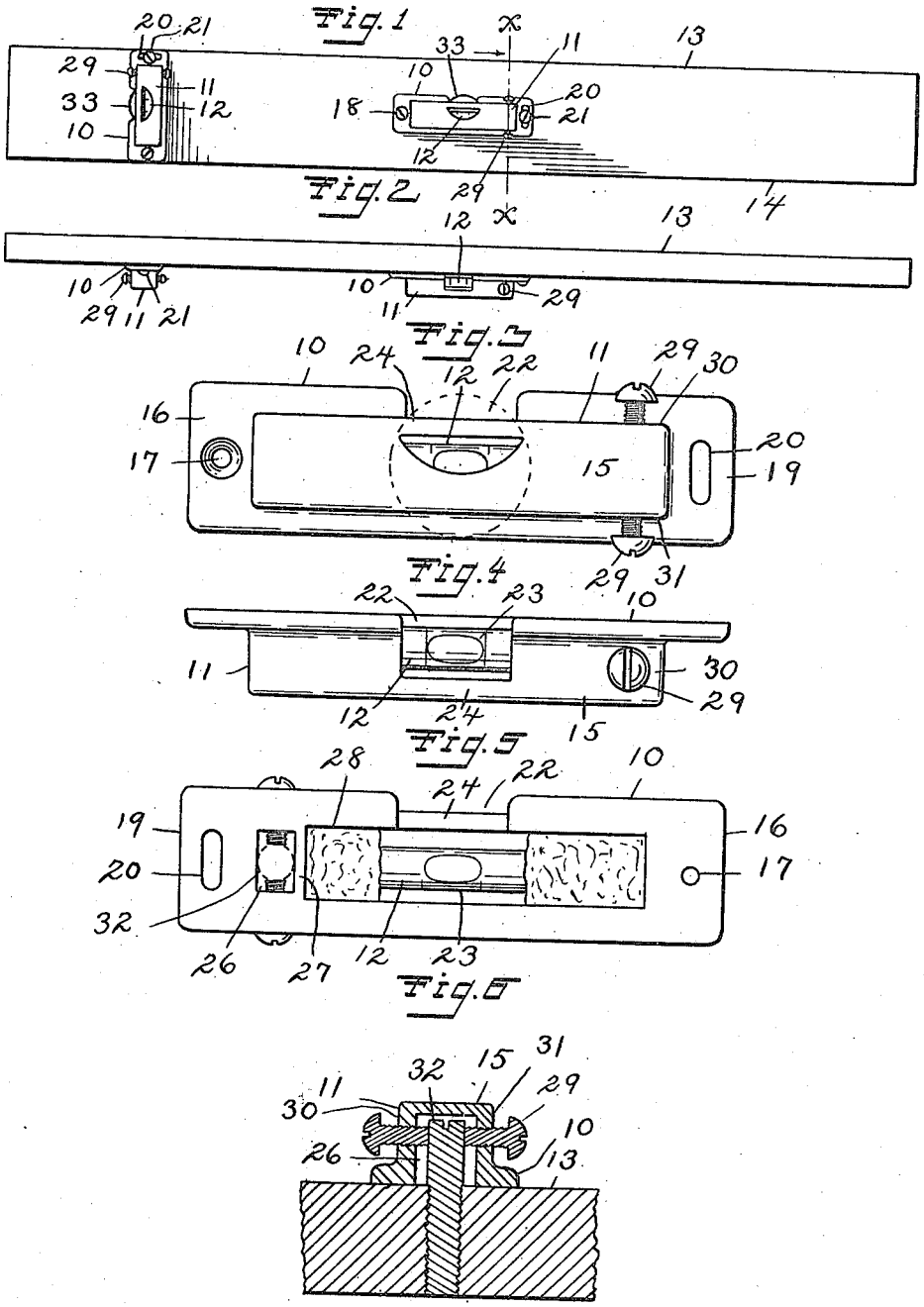
Inventor:
James Elliott Griffin.
By Louis M. Schmidt
Atty.

UNITED STATES PATENT OFFICE.

JAMES ELLIOTT GRIFFIN, OF NEW BRITAIN, CONNECTICUT.

LEVEL.

1,239,590.     Specification of Letters Patent.     Patented Sept. 11, 1917.

Application filed August 21, 1916.   Serial No. 116,041.

*To all whom it may concern:*

Be it known that I, JAMES ELLIOTT GRIFFIN, a citizen of the United States, residing at New Britain, in the county of Hartford and State of Connecticut, have invented certain new and useful Improvements in Levels, of which the following is a specification.

My invention relates to improvements in levels, and the object of my improvement is to provide a complete, self-contained level indicator structure comprising a housing and a spirit indicator contained therein, such as can be readily applied to a straight edge or level body of any desired form so as to make a complete level of any size or form, whereby by providing one of the said structures a level may be made to meet the individual requirements.

In other words, one can buy one of the indicator structures and make a complete level to suit himself.

In the accompanying drawing:—

Figure 1 is a front elevation of my improved level.

Fig. 2 is a plan view of the same.

Fig. 3 is a front elevation of one of the indicator structures, on an enlarged scale.

Fig. 4 is a plan view of the same.

Fig. 5 is a bottom view of the same.

Fig. 6 is a sectional view on the line $x$ $x$ of Fig. 1.

My improved level comprises a level indicator structure 10, consisting of a housing 11 containing a spirit indicator 12 of the elongated type such as is used in levels for use of carpenters and masons and builders generally, the said structure 10 being suitable for being mounted on one of the side faces of a level body 13, consisting of a strip of wood of suitable size and form corresponding to the size and type of level desired, and having the bottom edge 14 finished as a straight edge, and means are provided for adjusting the said structure 10 so that the spirit indicator 12 will correspond with the said finished bottom edge 14, as is usual in levels.

The housing 11 comprises for the body portion 15 a hollow, shell-like structure, open at the rear side, inclosed by a flange-like base on all sides, the ends of the said base being extended, one end 16 shown at the left having a hole 17 for a holding screw 18, and the other end 19, at the right, having a slot 20 for another holding screw 21. The body portion 15 and the base are cut away generally at the middle of the top portion to provide an opening 22 for exposing the sight portion 23 of the spirit indicator 12. I prefer however to provide a bar 24 across the opening 22 at the upper and outer portion to protect the spirit indicator, the said bar 24 as shown being an extension of the upper and outer corner portion of the body portion 15 of the housing 11.

The body portion 15 is of sufficient size to house the spirit indicator 12, the same being secured therein by its ends by plaster of Paris in the usual manner, and also to provide a chamber 26 at one end, and preferably as shown at the end having the slot 20, for housing special adjusting means. A bridge 27 separates the chamber 26 from the general interior 28 of the body portion 15 in which the spirit indicator 12 is housed.

The said adjusting means comprise a pair of opposed screws 29 in alinement, one passing through the upper wall 30 of the body portion 15 and the other passing through the lower wall 31 thereof, the said screws 29 having the heads accessible from the outside, and the inner ends being suitably positioned to make bearing engagement with a stud 32, fixedly secured in the side face of the level body 13, and which projects into the chamber 26.

The level body 13 is provided with a sight hole 33 back of the opening 22 and the sight 23 for admitting light and permitting the sight 23 to be observed from the rear side.

The indicator structure 10 is secured to the level body 13 by means of the screws 18 and 21, the adjusting screws 29 in coöperation with the stud 32 serving as locking means for positively holding the structure in the adjusted position. When it is desired to change the adjustment the screw 21 in the slot 20 is loosened of its hold slightly, the adjusting screws 29 are shifted to the necessary extent, and then the screw 21 is again tightened.

In the level shown in Fig. 1 the indicator structure 10 is positioned at the middle of the side face of the level body 13 and an indicator structure 10$^a$ is shown adjacent the left end, as shown, somewhat smaller than the first mentioned structure 10, being in other respects similar in construction, the structure 10 being adapted for horizontal use and the structure 10$^a$ being adapted for vertical use.

The bearing portion of the stud 32 that is in bearing engagement with the ends of the adjusting screws 29 as shown is cylindrical and the end faces of the said adjusting screws 29 are flat. Therefore in all positions of the adjusting screws for different positions of adjustment there is tangential engagement of the ends of the screws with the stud, which feature insures in any and all positions a firm and positive engagement of the locking means and permits of firmly setting the screws to effect the locking without liability of deranging the adjustment.

In the means for adjustment shown and described, the housing 11, with the spirit indicator 12 housed therein, is moved bodily as a unit, and the adjusting means comprise the fixed portion or member in the form of the stud 32, that is carried by the level body or stock 13, and the movable portion, composed of the screws 29. Furthermore, the said movable portion is itself supported by the housing 11, as the screws 29 are threaded into the walls thereof. This arrangement of the parts is particularly desirable in a device, such as shown, for use in making levels for individual use by mounting the structure on a stock that is adapted to meet the requirements of the particular case for which the same may be desired.

I claim as my invention:—

1. A level indicator structure suitable for being operatively mounted on the side face of a level stock, for making a complete level, comprising a housing for inclosing a spirit indicator having means for receiving holding screws and which permit of limited movement of the said structure pivotally for purpose of adjustment, and adjusting devices for effecting such movement of the said structure comprising a fixed part and movable parts coöperating therewith, a stud on the said stock serving as the said fixed part, and the said movable parts being in the form of screws, operatively supported by opposed walls of the said structure and adapted to engage by their ends with the said stud.

2. A level indicator structure suitable for being mounted on the side face of a level stock for making a level, comprising a housing for inclosing a spirit indicator, the said housing having a sight opening for exposing the said indicator in the top wall and an extension of the said opening in the upper portion of the side wall, and the said housing being a unitary structure and having a bar that serves as a guard for the said indicator extending across the said opening.

JAMES ELLIOTT GRIFFIN.

Witnesses:
ALFRED L. THOMPSON,
BERNADOTTE LOOMIS.

Copies of this patent may be obtained for five cents each, by addressing the "Commissioner of Patents, Washington, D. C."